(12) United States Patent
Tung

(10) Patent No.: US 12,072,831 B2
(45) Date of Patent: Aug. 27, 2024

(54) DYNAMIC PCIE SPEED-ADJUSTING METHOD AND WIRELESS DEVICE AND USER EQUIPMENT THEREOF

(71) Applicant: MEDIATEK INC., Hsinchu (TW)

(72) Inventor: Sheng-Ya Tung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/154,424

(22) Filed: Jan. 13, 2023

(65) Prior Publication Data
US 2023/0229619 A1    Jul. 20, 2023

Related U.S. Application Data

(60) Provisional application No. 63/368,508, filed on Jul. 15, 2022, provisional application No. 63/301,077, filed on Jan. 20, 2022.

(51) Int. Cl.
G06F 13/42    (2006.01)

(52) U.S. Cl.
CPC .. *G06F 13/4282* (2013.01); *G06F 2213/0026* (2013.01)

(58) Field of Classification Search
CPC ......... G06F 13/4282; G06F 2213/0026; G06F 1/3234; G06F 13/42; G06F 1/3253; H04W 52/02; H04W 52/0209
See application file for complete search history.

(56) References Cited

U.S. PATENT DOCUMENTS

| | | | |
|---|---|---|---|
| 2005/0215263 A1* | 9/2005 | Tsien | H04L 1/0002 455/67.11 |
| 2006/0143338 A1 | 6/2006 | Hunsakar et al. | |
| 2012/0074988 A1* | 3/2012 | Lashkari | H04L 25/0264 327/109 |
| 2015/0081929 A1* | 3/2015 | Wang | G06F 13/10 710/8 |
| 2015/0370305 A1* | 12/2015 | Wietfeldt | G06F 1/3206 713/320 |
| 2017/0237673 A1* | 8/2017 | Law | H04W 4/023 370/338 |
| 2017/0280385 A1* | 9/2017 | Klacar | G06F 1/3296 |
| 2021/0349844 A1* | 11/2021 | Schaefer | G06F 13/4282 |

FOREIGN PATENT DOCUMENTS

| | | |
|---|---|---|
| CN | 107257266 A | 10/2017 |
| CN | 107395512 A | 11/2017 |
| WO | WO-2018214354 A1 * | 11/2018 ........... H04L 1/0002 |

OTHER PUBLICATIONS

Extended European Search Report dated Jun. 14, 2023, issued in application No. EP 23152238.4.
Chinese language office action dated Aug. 14, 2023, issued in application No. TW 112102205.

* cited by examiner

*Primary Examiner* — Phong H Dang
(74) *Attorney, Agent, or Firm* — McClure, Qualey & Rodack, LLP

(57) ABSTRACT

A Dynamic Peripheral Component Interconnect Express (PCIe) speed-adjusting method is provided. The dynamic PCIe speed-adjusting method is applied to a wireless device. The dynamic PCIe speed-adjusting method may include the following step: the wireless device determines whether to change from the current PCIe speed to a target PCIe speed based on the noise level threshold, the signal-to-noise ratio (SNR) threshold, the current data-rate requirement, or a combination thereof.

14 Claims, 4 Drawing Sheets

DYNAMIC PCIE SPEED-ADJUSTING METHOD AND WIRELESS DEVICE AND USER EQUIPMENT THEREOF

CROSS REFERENCE TO RELATED APPLICATIONS

This application claims priority of U.S. Provisional Patent Application No. 63/301,077, filed on Jan. 20, 2022 and U.S. Provisional Patent Application No. 63/368,508, filed on Jul. 15, 2022, the entirety of which is incorporated by reference herein.

BACKGROUND OF THE INVENTION

Field of the Invention

The invention generally relates to Peripheral Component Interconnect Express (PCIe) technology, and more particularly, to a PCIe technology in which the PCIe speed may be adjusted dynamically.

Description of the Related Art

In conventional communication technologies, a Peripheral Component Interconnect Express (PCIe)-based wireless device may use Wi-Fi or Bluetooth to operate in the Industrial Scientific Medical (ISM) band, along with a PCIe interface to communicate with the host platform.

In order to receive a wireless packet correctly, the received signal power must be greater than the noise power (i.e. the signal-to-noise ratio (SNR) should be good enough) to prevent the noise from influencing the performance of the wireless device. However, the PCIe operating noise from the PCIe interface may affect the SNR. Therefore, when the SNR is degraded because of the PCIe operating noise, the performance of the wireless device will suffer.

BRIEF SUMMARY OF THE INVENTION

A dynamic Peripheral Component Interconnect Express (PCIe) speed-adjusting method, wireless device and user equipment (UE) are provided to overcome the problems mentioned above. The present application proposes a more flexible way to dynamically adjust the PCIe speed based on the noise level threshold, the signal to noise ratio (SNR) threshold, the current data-rate requirement, or a combination thereof. Therefore, in the present application, the PCIe interference with the performance of the wireless device will be reduced.

An embodiment of the invention provides a dynamic Peripheral Component Interconnect Express (PCIe) speed-adjusting method. The dynamic PCIe speed-adjusting method is applied to a wireless device. The dynamic PCIe speed-adjusting method may include a step in which the wireless device determines whether to change from the current PCIe speed to a target PCIe speed based on the noise level threshold, the SNR threshold, the current data-rate requirement, or a combination thereof.

An embodiment of the invention provides a wireless device. The wireless device may include a processor. The processor is configured to determine whether to change from the current PCIe speed to a target PCIe speed based on the noise level threshold, the SNR threshold, the current data-rate requirement, or a combination thereof.

An embodiment of the invention provides a user equipment (UE). The UE may include a host device, a Peripheral Component Interconnect Express (PCIe) interface and a wireless device. The wireless device is coupled to the host device through the PCIe interface. The host device or the wireless device is configured to determine whether to change from the current PCIe speed to a target PCIe speed based on the noise level threshold, the SNR threshold, the current data-rate requirement, or a combination thereof.

Other aspects and features of the invention will become apparent to those with ordinary skill in the art upon review of the following descriptions of specific embodiments of the dynamic PCIe speed-adjusting methods, wireless device and UE.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
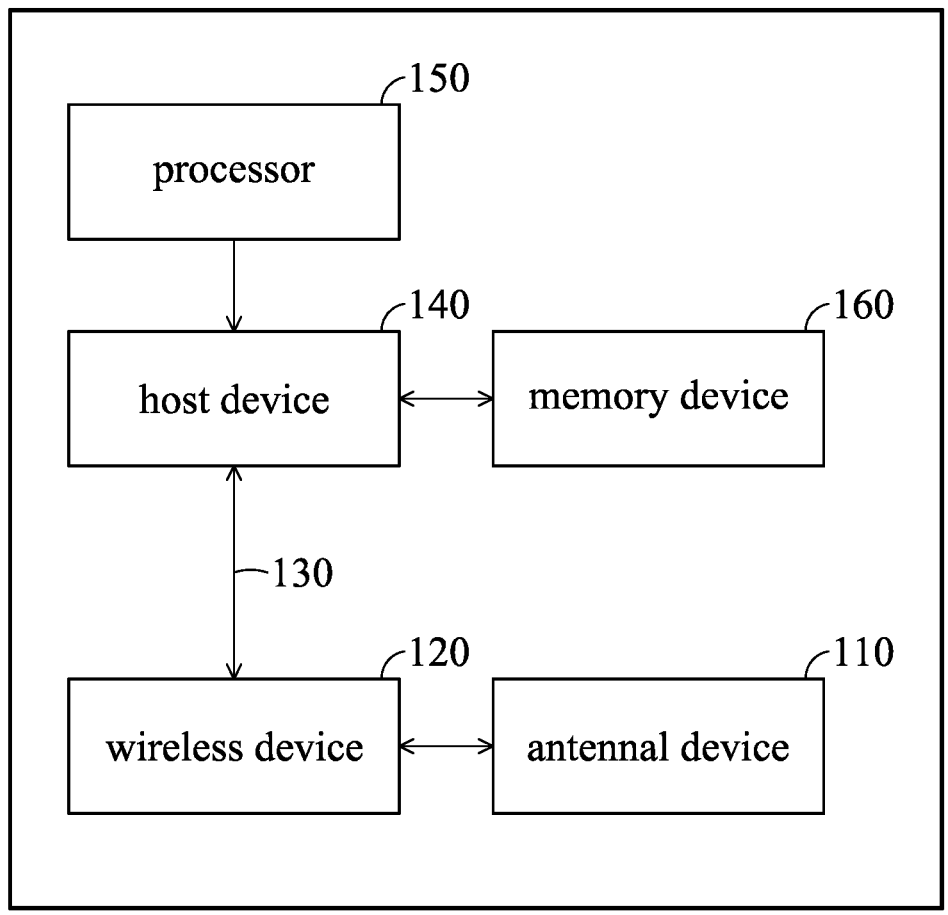
FIG. 1 is a block diagram of a UE 100 according to an embodiment of the invention.

FIG. 1 is a block diagram of a UE 100 according to an embodiment of the invention. As shown in FIG. 1, the UE 100 may comprise an antenna circuit 110, a wireless device 120, a Peripheral Component Interconnect Express (PCIe) interface 130, a host device 140, a processor 150 and a memory device 160. It should be noted that, in order to clarify the concept of the invention, FIG. 1 presents a simplified block diagram in which only the elements relevant to the invention are shown. However, the invention should not be limited to what is shown in FIG. 1. The UE 100 may comprise other elements.

In the embodiments of the invention, the UE 100 may be a smartphone, a Personal Data Assistant (PDA), a pager, a laptop computer, a desktop computer, a wireless handset, or any computing device that includes a wireless communications interface.

In the embodiments of the invention, the antenna circuit 110 may receive signals from the network node and transmit signals to the network node, e.g., an access point (AP), a base station, and so on. The antenna circuit 110 may comprise one or more antennas.

In the embodiments of the invention, the wireless device 120 may be a wireless network interface card, but the invention should not be limited thereto. The wireless device 120 may provide wireless communication functions, e.g., Wi-Fi, Bluetooth, but the invention should not be limited thereto. The wireless device 120 may be coupled to the antenna circuit 110 to receive or transmit the wireless signal. In addition, the wireless device 120 may be coupled to the host device 140 through the PCIe interface 130 to communicate with the host device 140.

In the embodiments of the invention, the wireless device 120 may be regarded as an end point (EP) or a PCIe device of the PCIe fabric and the host device 140 may be regarded as a root complex (RC) or a PCIe host of the PCIe fabric.

According to the embodiments of the invention, the wireless device 120 or the host device 140 determines whether change from the current PCIe speed to a target PCIe speed based on the noise level threshold, the signal to noise ratio (SNR) threshold, the current data-rate requirement, or a combination thereof. Details are discussed in FIGS. 2-4 below. The noise level threshold, the SNR threshold and the current data-rate requirement may be pre-set or pre-stored in the UE 100. The data-rate requirement may be the data throughput requirement for different frequency bands, e.g., 2.4 GHz Wi-Fi band, 5 GHz Wi-Fi band and 6 GHz Wi-Fi band, but the invention should not be limited thereto. For higher frequency band (e.g., 5 GHz Wi-Fi band or 6 GHz Wi-Fi band), the data throughput requirement may be increased, i.e., a faster PCIe speed may be required. In the embodiments of the invention, the UE 100 may support different PCIe speeds, e.g., Gen1 (2.5 GT/s), Gen2 (5 GT/s), Gen3 (8 GT/s), but the invention should not be limited thereto. The wireless device 120 or the host device 140 may dynamically adjusts the PCIe speeds based on the PCIe speeds supported by the UE 100.

According to the embodiments of the invention, the wireless device 120 or the host device 140 may perform the operations of changing the current PCIe speed to the target PCIe speed by sending a training sequence (TS) ordered set. That is to say, the wireless device 120 or the host device 140 may send a training sequence (TS) ordered set to trigger a state transition from normal operating state (L0) to the Recovery state in Link Training and Status State Machine (LTSSM). Then, the PCIe speed change may be performed in the Recovery state.

In the embodiments of the invention, the processor 150 may control the operations of the wireless device 120, the host device 140 and the memory device 160. According to an embodiment of the invention, the processor may be a central processing unit (CPU). According to an embodiment of the invention, the processor 150 may also be arranged to execute the program codes of the software modules. The program codes accompanied by specific data in a data structure may also be referred to as a processor logic unit or a stack instance when being executed. Therefore, the processor 150 may be regarded as being comprised of a plurality of processor logic units, each for executing one or more specific functions or tasks of the corresponding software modules.

In the embodiments of the invention, the memory device 160 may store the software and firmware program codes, system data, user data, etc. of the UE 100. The memory device 160 may be a volatile memory such as a random access memory (RAM); a non-volatile memory such as a flash memory or a read-only memory (ROM); a hard disk; or any combination thereof.

Figure 2:
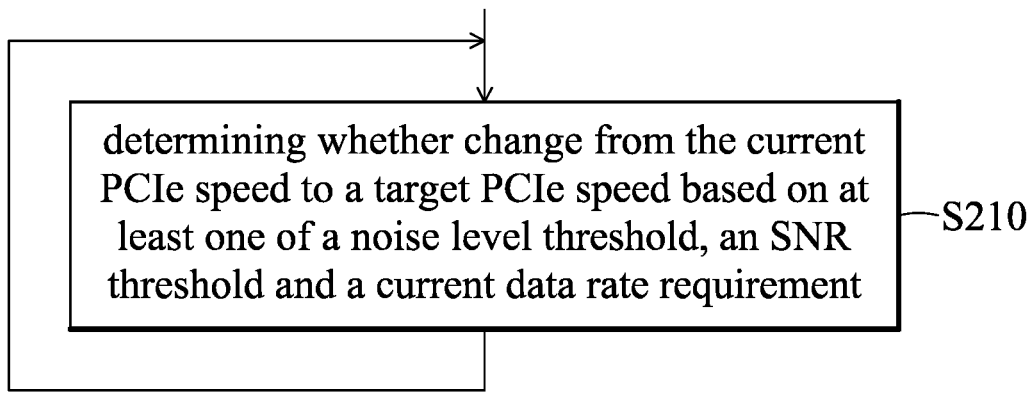
FIG. 2 is a flow chart illustrating a dynamic PCIe speed-adjusting method according to an embodiment of the invention.

FIG. 2 is a flow chart illustrating a dynamic PCIe speed-adjusting method according to an embodiment of the invention. The dynamic PCIe speed-adjusting method may be applied to the wireless device 120 or the host device 140 of the UE 100. As shown in FIG. 2, in step 210, the wireless device 120 or the host device 140 determines whether change from the current PCIe speed to a target PCIe speed based on at least one of a noise level threshold, a signal to noise ratio (SNR) threshold and a current data rate requirement.

Figure 3:
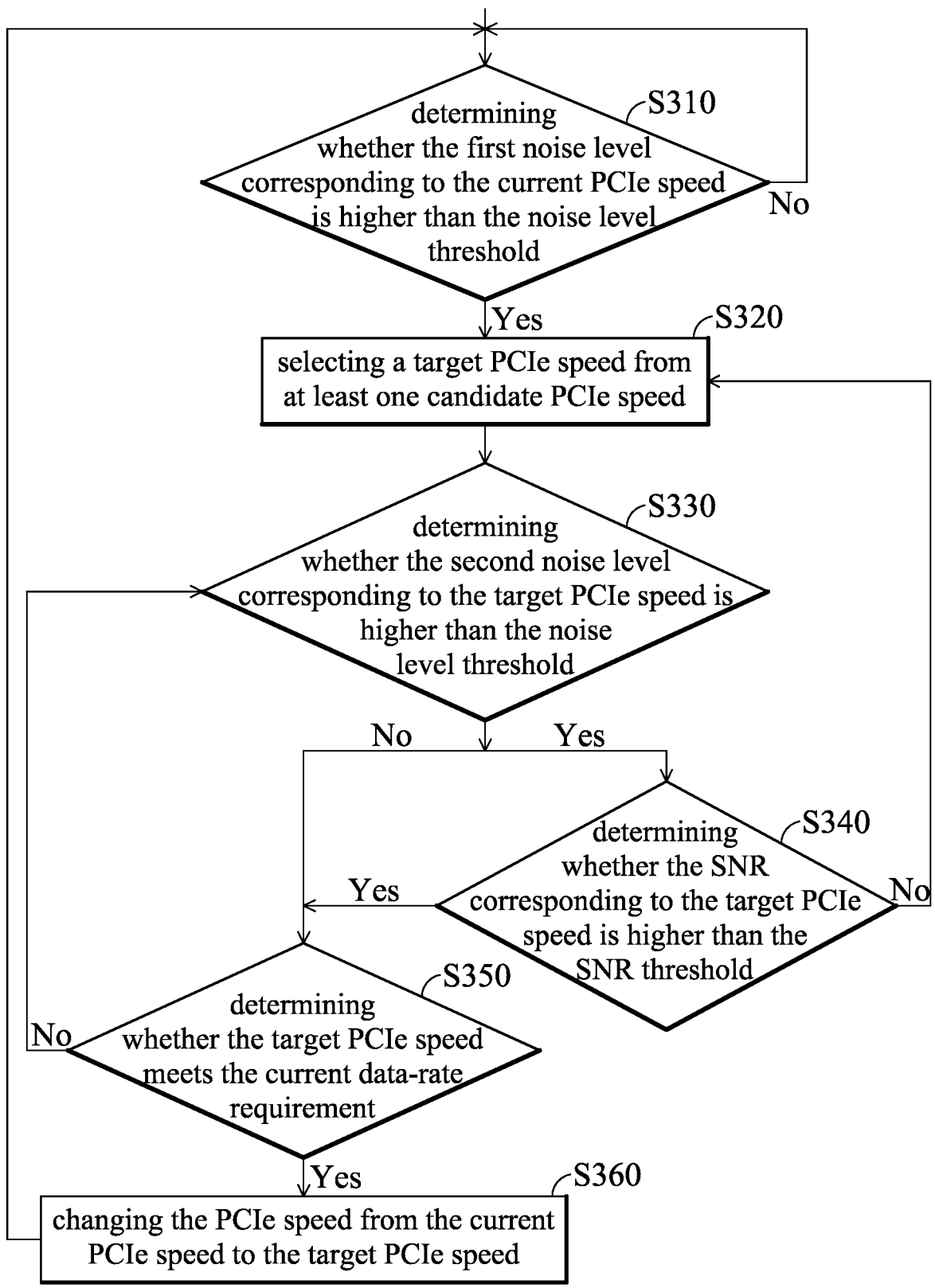
FIG. 3 is a flow chart illustrating the step S210 according to an embodiment of the invention.

FIG. 3 is a flow chart illustrating the step S210 according to an embodiment of the invention. As shown in FIG. 3, in step S310, the wireless device 120 or the host device 140 may determine whether the first noise level corresponding to the current PCIe speed is higher than the noise level threshold first.

When the wireless device 120 or the host device 140 determines that the first noise level corresponding to the current PCIe speed is higher than the noise level threshold, step S320 is performed. In step S320, the wireless device 120 or the host device 140 may select a target PCIe speed from at least one candidate PCIe speed. For example, when the UE 100 supports two PCIe speeds, Gen1 (2.5 GT/s) and Gen2 (5 GT/s) and the PCIe speed Gen1 (2.5 GT/s) is the current PCIe speed, the wireless device 120 or the host device 140 may select PCIe speed Gen1 (2.5 GT/s) to be the target PCIe speed. In addition, in an embodiment of the invention, the wireless device 120 or the host device 140 may select the candidate PCIe speed with the lowest speed to be the target PCIe speed first to save power. For example, if the UE 100 has candidate PCIe speeds Gen2 (5 GT/s) and Gen3 (8 GT/s), the wireless device 120 or the host device 140 may select the PCIe speed Gen2 (5 GT/s) first to save power.

In step S330, the wireless device 120 or the host device 140 may determines whether the second noise level corresponding to the target PCIe speed is higher than the noise level threshold.

When the second noise level is higher than the noise level threshold, step S340 is performed. In step S340, the wireless device 120 or the host device 140 may determine whether the SNR corresponding to the target PCIe speed is higher than the SNR threshold. In this step, it means that the noise levels of the current PCIe speed and the target PCIe speed are not good. Therefore, the wireless device 120 or the host device 140 may further determine whether the SNR corresponding to the target PCIe speed is higher than the SNR threshold. That is to say, if the SNR corresponding to the target PCIe speed is good enough, the target PCIe still may be concerned by the wireless device 120 or the host device 140, even if the second noise level of the target PCIe speed is higher than the noise level threshold.

When the SNR corresponding to the target PCIe speed is not higher than the SNR threshold (i.e., the SNR corresponding to the target PCIe speed is worse), step S320 is performed. The wireless device 120 or the host device 140 may select another target PCIe speed from the candidate PCIe speeds.

When the SNR corresponding to the target PCIe speed is higher than the SNR threshold (i.e., the SNR corresponding to the target PCIe speed is good enough), step S350 is performed. In step S350, the wireless device 120 or the host device 140 may determine whether the target PCIe speed meets the current data-rate requirement.

When the target PCIe speed meets the current data-rate requirement, step S360 is performed. In step S360, the wireless device 120 or the host device 140 may change the PCIe speed from the current PCIe speed to the target PCIe speed. Then, the flow of FIG. 3 will be repeated again.

When the target PCIe speed does not meets the current data-rate requirement, step S320 is performed. The wireless device 120 or the host device 140 may select another target PCIe speed from the candidate PCIe speeds. Then, the wireless device 120 or the host device 140 may perform the following steps after step S320.

When the second noise level is not higher than the noise level threshold in step S330, step S350 is performed. The wireless device 120 or the host device 140 may determine whether the target PCIe speed meets the current data-rate requirement. When the target PCIe speed meets the current data-rate requirement, the wireless device 120 or the host device 140 may perform step S360. Then, the flow of FIG. 3 will be repeated again. When the target PCIe speed does not meets the current data-rate requirement, the wireless device 120 or the host device 140 may perform step S320.

In the embodiment of the invention, in an example, as shown in FIG. 3, when the wireless device 120 or the host device 140 determines that the first noise level corresponding to the current PCIe speed is not higher than the noise level threshold, the wireless device 120 or the host device 140 may maintain the current PCIe speed. Then, the flow of FIG. 3 will be repeated again.

In the embodiment of the invention, in another example, when the wireless device 120 or the host device 140 determines that the first noise level corresponding to the current PCIe speed is not higher than the noise level threshold, the wireless device 120 or the host device 140 may further determine whether the SNR corresponding to the current PCIe speed is higher than the SNR threshold. When the SNR corresponding to the current PCIe speed is higher than the SNR threshold, the wireless device 120 or the host device 140 may maintain the current PCIe speed. Then, the flow of FIG. 3 will be repeated again. When the SNR corresponding to the current PCIe speed is not higher than the SNR threshold, step S320 is performed. The wireless device 120 or the host device 140 may selects the target PCIe speed from at least one candidate PCIe speed and perform above operations for target PCIe speed. Then, the wireless device 120 or the host device 140 may perform the following steps after step S320. In this example, although the first noise level corresponding to the current PCIe speed is not higher than the noise level threshold, the SNR corresponding to the current PCIe speed may be not higher than the SNR threshold (i.e., the SNR corresponding to the current PCIe speed is worse). For example, when the distance between the current linked access point (AP) and the UE is farther and farther, the signal strength may be decreased, and as result the SNR will be decreased. Therefore, in this example, the wireless device 120 or the host device 140 may further determine whether the SNR corresponding to the current PCIe speed is higher than the SNR threshold to avoid that the SNR of the current PCIe speed is too bad.

Figure 4:
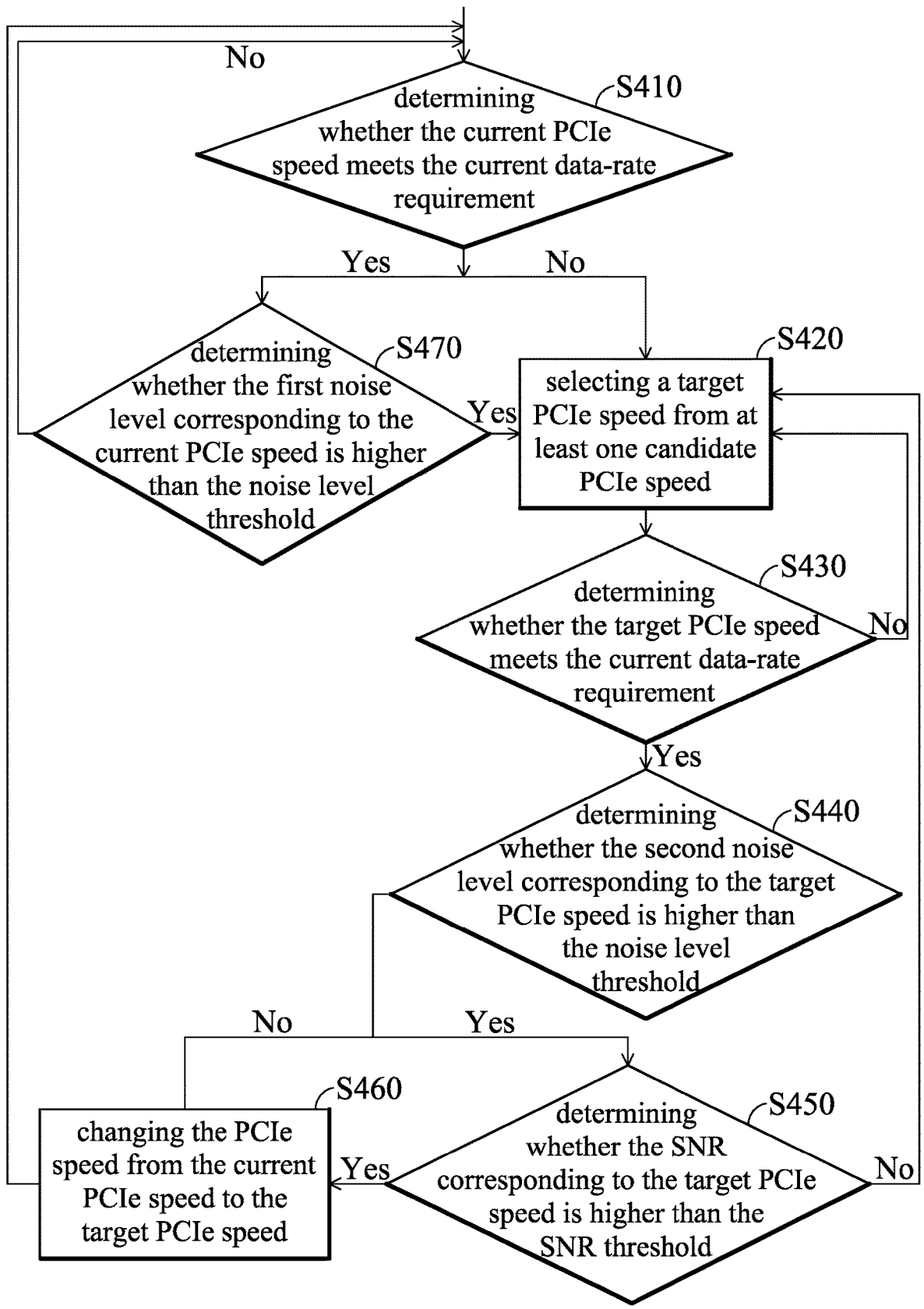
FIG. 4 is a flow chart illustrating the step S210 according to another embodiment of the invention.

FIG. 4 is a flow chart illustrating the step S210 according to another embodiment of the invention. As shown in FIG. 4, in step S410, the wireless device 120 or the host device 140 may determine whether the current PCIe speed meets the current data-rate requirement first.

When the current PCIe speed does not meet the current data-rate requirement, step S420 is performed. In step S420, the wireless device 120 or the host device 140 may select a target PCIe speed from at least one candidate PCIe speed. For example, when the UE 100 supports two PCIe speeds, Gen1 (2.5 GT/s) and Gen2 (5 GT/s) and the PCIe speed Gen1 (2.5 GT/s) is the current PCIe speed, the wireless device 120 or the host device 140 may select PCIe speed Gen2 (5 GT/s) to be the target PCIe speed. In an example, the wireless device 120 or the host device 140 may select the candidate PCIe speed with the lowest speed to be the target PCIe speed first to save power.

In step S430, the wireless device 120 or the host device 140 may determine whether the target PCIe speed meets the current data-rate requirement.

When the target PCIe speed does not meet the current data-rate requirement, step S420 is performed. The wireless device 120 or the host device 140 may select another target PCIe speed from the candidate PCIe speeds. Then, the wireless device 120 or the host device 140 may perform the following steps after step S420.

When the target PCIe speed meets the current data-rate requirement, step S440 is performed. In step S440, the wireless device 120 or the host device 140 may determines whether the second noise level corresponding to the target PCIe speed is higher than the noise level threshold.

When the second noise level is higher than the noise level threshold, step S450 is performed. In step S450, the wireless device 120 or the host device 140 may determine whether the SNR corresponding to the target PCIe speed is higher than the SNR threshold.

When the SNR corresponding to the target PCIe speed is higher than the SNR threshold, step S460 is performed. In step S460, the wireless device 120 or the host device 140 may change the PCIe speed from the current PCIe speed to the target PCIe speed. Then, the flow of FIG. 4 will be repeated again.

When the SNR corresponding to the target PCIe speed is not higher than the SNR threshold, step S420 is performed. The wireless device 120 or the host device 140 may select another target PCIe speed from the candidate PCIe speeds. Then, the wireless device 120 or the host device 140 may perform the following steps after step S420.

When the second noise level is not higher than the noise level threshold, step S460 is performed. The wireless device 120 or the host device 140 may change the PCIe speed from the current PCIe speed to the target PCIe speed. Then, the flow of FIG. 4 will be repeated again.

When the current PCIe speed meets the current data-rate requirement in step S410, step S470 is performed. In step S470, the wireless device 120 or the host device 140 may determine whether the first noise level corresponding to the current PCIe speed is higher than the noise level threshold.

When the wireless device 120 or the host device 140 determines that the first noise level corresponding to the current PCIe speed is higher than the noise level threshold, step S420 is performed. The wireless device 120 or the host device 140 may select a target PCIe speed from at least one candidate PCIe speed. Then, the wireless device 120 or the host device 140 may perform the following steps after step S420.

In the embodiment of the invention, in an example, as shown in FIG. 4, when the wireless device 120 or the host device 140 determines that the first noise level corresponding to the current PCIe speed is not higher than the noise level threshold, the wireless device 120 or the host device 140 may maintain the current PCIe speed. Then, the flow of FIG. 4 will be repeated again.

In the embodiment of the invention, in another example, when the wireless device 120 or the host device 140 determines that the first noise level corresponding to the current PCIe speed is not higher than the noise level threshold, the wireless device 120 or the host device 140 may further determine whether the SNR corresponding to the current PCIe speed is higher than the SNR threshold. When the SNR corresponding to the current PCIe speed is higher than the SNR threshold, the wireless device 120 or the host device 140 may maintain the current PCIe speed. Then, the flow of FIG. 4 will be repeated again. When the SNR corresponding to the current PCIe speed is not higher than the SNR threshold, step S420 is performed. The wireless device 120 or the host device 140 may selects the target PCIe speed from at least one candidate PCIe speed and perform above operations for target PCIe speed. Then, the wireless device 120 or the host device 140 may perform the following steps after step S420. In this example, although the first noise level corresponding to the current PCIe speed is not higher than the noise level threshold, the SNR corresponding to the current PCIe speed may be not higher than the SNR threshold (i.e., the SNR corresponding to the current PCIe speed is worse). For example, when the distance between the current linked access point (AP) and the UE is farther and farther, the signal strength may be decreased, and as result the SNR will be decreased. Therefore, in this example, the wireless device 120 or the host device 140 may further determine whether the SNR corresponding to the current PCIe speed is higher than the SNR threshold.

According to an Embodiment of the Invention

It should be noted that the flows of FIG. 3 and FIG. 4 are only used to illustrate the embodiments of the invention, but the invention should not be limited thereto. The order of the steps also can be changed or modified.

In the dynamic PCIe speed-adjusting methods provided in the embodiments of the invention, the PCIe speed may be dynamically adjusted based on at least one of the noise level threshold, the SNR threshold and the current data-rate requirement. Therefore, in the he dynamic PCIe speed-adjusting methods provided in the embodiments of the invention, the PCIe interference with the performance of the wireless device can be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in the UE. In the alternative, the processor and the storage medium may reside as discrete components in the UE. Moreover, in some aspects, any suitable computer-program product may comprise a computer-readable medium comprising codes relating to one or more of the aspects of the disclosure. In some aspects, a computer software product may comprise packaging materials.

It should be noted that although not explicitly specified, one or more steps of the methods described herein can include a step for storing, displaying and/or outputting as required for a particular application. In other words, any data, records, fields, and/or intermediate results discussed in the methods can be stored, displayed, and/or output to another device as required for a particular application. While the foregoing is directed to embodiments of the present invention, other and further embodiments of the invention can be devised without departing from the basic scope thereof. Various embodiments presented herein, or portions thereof, can be combined to create further embodiments. The above description is of the best-contemplated mode of carrying out the invention. This description is made for the purpose of illustrating the general principles of the invention and should not be taken in a limiting sense. The scope of the invention is best determined by reference to the appended claims.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A dynamic Peripheral Component Interconnect Express (PCIe) speed-adjusting method, applied to a wireless device, comprising:
    determining, by the wireless device, whether to change from a current PCIe speed to a target PCIe speed based on at least one of a noise level threshold, a signal to noise ratio (SNR) threshold and a current data rate requirement;
    wherein the determining, by the wireless device, whether to change from the current PCIe speed to the target PCIe speed based on at least one of the noise level threshold, the signal to noise ratio (SNR) threshold and the current data rate requirement, comprising:
    determining, by the wireless device, whether a first noise level corresponding to the current PCIe speed is higher than the noise level threshold;
    selecting, by the wireless device, the target PCIe speed from at least one candidate PCIe speed in response to the first noise level being higher than the noise level threshold;
    determining, by the wireless device, whether a second noise level corresponding to the target PCIe speed is higher than the noise level threshold; and
    determining, by the wireless device, whether an SNR corresponding to the target PCIe speed is higher than the SNR threshold in response to the second noise level being higher than the noise level threshold.

2. The dynamic PCIe speed-adjusting method of claim 1, further comprising:
    selecting, by the wireless device, another target PCIe speed from the at least one candidate PCIe speed in response to the SNR corresponding to the target PCIe speed not being higher than the SNR threshold.

3. The dynamic PCIe speed-adjusting method of claim 1, further comprising:
    determining, by the wireless device, whether the target PCIe speed meets the current data-rate requirement in response to the SNR corresponding to the target PCIe speed being higher than the SNR threshold; and changing, by the wireless device, from the current PCIe speed to the target PCIe speed in response to the target PCIe speed meeting the current data-rate requirement.

4. The dynamic PCIe speed-adjusting method of claim 1, further comprising:
determining, by the wireless device, whether the target PCIe speed meets the current data-rate requirement in response to the second noise level not being higher than the noise level threshold;
changing, by the wireless device, from the current PCIe speed to the target PCIe speed in response to the target PCIe speed meeting the current data-rate requirement; and
selecting, by the wireless device, another target PCIe speed from the at least one candidate PCIe speed in response to the target PCIe speed not meeting the current data-rate requirement.

5. The dynamic PCIe speed-adjusting method of claim 1, further comprising:
maintaining, by the wireless device, the current PCIe speed in response to the first noise level not being higher than the noise level threshold.

6. The dynamic PCIe speed-adjusting method of claim 1, further comprising:
determining, by the wireless device, whether an SNR corresponding to the current PCIe speed is higher than the SNR threshold in response to the first noise level not being higher than the noise level threshold; and
selecting, by the wireless device, the target PCIe speed from the at least one candidate PCIe speed in response to the SNR corresponding to the current PCIe speed not being higher than the SNR threshold.

7. A wireless device, comprising:
a processor, which is configured to:
determine whether to change from a current PCIe speed to a target PCIe speed based on at least one of a noise level threshold, a signal to noise ratio (SNR) threshold and a current data rate requirement;
wherein when determines whether to change from the current PCIe speed to the target PCIe speed based on at least one of the noise level threshold, the signal to noise ratio (SNR) threshold and the current data rate requirement, the processor is configured to:
determine whether a first noise level corresponding to the current PCIe speed is higher than the noise level threshold;
select a target PCIe speed from at least one candidate PCIe speed in response to the first noise level being higher than the noise level threshold;
determine whether a second noise level corresponding to the target PCIe speed is higher than the noise level threshold; and
determine whether an SNR corresponding to the target PCIe speed is higher than the SNR threshold in response to the second noise level being higher than the noise level threshold.

8. The wireless device of claim 7, wherein the processor further selects another target PCIe speed from the at least one candidate PCIe speed in response to the SNR corresponding to the target PCIe speed not being higher than the SNR threshold.

9. The wireless device of claim 7, wherein the processor further determines whether the target PCIe speed meets current data-rate requirement in response to the SNR corresponding to the target PCIe speed being higher than the SNR threshold, and changes from the current PCIe speed to the target PCIe speed in response to the target PCIe speed meeting the current data-rate requirement.

10. The wireless device of claim 7, wherein the processor further determines whether the target PCIe speed meets the current data-rate requirement in response to the second noise level not being higher than the noise level threshold, wherein the processor changes from the current PCIe speed to the target PCIe speed in response to the target PCIe speed meeting the current data-rate requirement, and selects another target PCIe speed from the at least one candidate PCIe speed in response to the target PCIe speed not meeting the current data-rate requirement.

11. The wireless device of claim 7, wherein the processor further maintains the current PCIe speed in response to the first noise level not being higher than the noise level threshold.

12. The wireless device of claim 7, wherein the processor further determines whether an SNR corresponding to the current PCIe speed is higher than the SNR threshold in response to the first noise level not being higher than the noise level threshold, and selects the target PCIe speed from the at least one candidate PCIe speed in response to the SNR corresponding to the current PCIe speed not being higher than the SNR threshold.

13. A user equipment (UE), comprising:
a host device;
a Peripheral Component Interconnect Express (PCIe) interface;
a wireless device, coupled to the host device through the PCIe interface;
wherein the host device or the wireless device is configured to:
determine whether to change from a current PCIe speed to a target PCIe speed based on at least one of a noise level threshold, a signal to noise ratio (SNR) threshold and a current data rate requirement;
wherein when determines whether to change from the current PCIe speed to the target PCIe speed based on at least one of the noise level threshold, the signal to noise ratio (SNR) threshold and the current data rate requirement, the host device or the wireless device is configured to:
determine whether a first noise level corresponding to the current PCIe speed is higher than the noise level threshold;
select a target PCIe speed from at least one candidate PCIe speed in response to the first noise level being higher than the noise level threshold;
determine whether a second noise level corresponding to the target PCIe speed is higher than the noise level threshold; and
determine whether an SNR corresponding to the target PCIe speed is higher than the SNR threshold in response to the second noise level being higher than the noise level threshold.

14. The UE of claim 13, wherein the host device or the wireless device changes the current PCIe speed to the target PCIe speed by sending a training sequence (TS) ordered set.

* * * * *